Patented Jan. 26, 1943

2,309,108

UNITED STATES PATENT OFFICE 2,309,108

WATERPROOF ABRASIVE BLOCK AND METHOD OF PRODUCING THE SAME

Lloyd A. Hatch, St. Paul, Minn., assignor to Minnesota Mining & Manufacturing Company, St. Paul, Minn., a corporation of Delaware No Drawing. Continuation of application Serial No. 418,148, January 2, 1930. This application February 13, 1937, Serial No. 125,673

4 Claims. (Cl. 51—298)

This application is a continuation of the copending joint application of Lloyd A. Hatch and George Netherly, Serial No. 418,148, filed January 2, 1930, for a Waterproof abrasive block, and is also a continuation in part of my application Serial No. 318,390, filed November 10, 1928, now pending as Serial No. 691,318, filed Sept. 28, 1933, from which applications the disclosure of the present application has been taken.

This invention relates to abrasives; more particularly to molded abrasives and polishing devices and to a method of making the same. Still more particularly, the invention relates to the production of rubber bonded abrasive articles in thinly sheeted or molded block form. A further object of the invention resides in intimately and uniformly associating abrasive particles with a bond therefor including rubber as a component, wherein the abrasive forms a high percentage of the entire composition and the article has characteristics of flexibility suitable for buffing, ability to conform to uneven surfaces in rubbing or polishing varnished or lacquered surfaces; long abrasive utility even under extreme changes in temperature and the heat incident to abrasive operations; cohesion between the abrasive particles and the bond under extreme flexion of the article, even under changes in temperature and the heat of friction incident to abrading operations.

It is a still further object of the invention to provide an abrasive article wherein the abrasive particles are bonded by a binder including rubber as a component, the abrasive article being characterized by uniformity of composition and abrading texture, cohesion between the bond and the abrasive particles and resistance to disintegration by heat of friction due to abrading operations, and high percentages of mineral and low percentages of bond combined into a flexible article which will readily conform to uneven surfaces in abrading operations such as rubbing down varnished and lacquered surfaces.

Other advantages and objects of the invention will be apparent as this description proceeds, from which more particularly it will appear that the invention relates to the provision of coated particles or granules and to a method of making the same; to the provision of particles coated or uncoated, bonded in thinly sheeted or molded block form; to the provision of particles, granules or grits particularly in a mass of pulverulent form of separated particles having a resinous coating, preferably of synthetic resins such as a phenol formaldehyde condensation product; to the provision of resinous coated particles, granules, or grits bonded in thinly sheeted or molded block form, more particularly, a mass of separated particles in pulverulent form, the individual particles having a coating of resinous material for increasing the cohesion between the bond and the abrasive particles when the partciles are bonded into an article in thinly sheeted or molded block form; to the provision of a rubber bonded abrasive composition in which the properties of the rubber are modified by a tempering agent which will render the rubber capable of withstanding the processing incident to intermingling of the rubber and the abrasive, whereby the heat of friction in combining these ingredients will not tend to destroy the bonding effect of the rubber; whereby, further, any predetermined physical characteristics may be obtained with certainty and the product, when in use, will be free from detrimental effects caused by changes in temperature and the heat of friction incident to abrading operations.

In accordance with the invention, granules such as abrasive particles, are intimately mixed with a synthetic resin, such as a phenol formaldehyde condensation product, to coat the particles, the mass thus obtained being in pulverulent form. In coating the particles with a synthetic resin, the synthetic resin may be added in the form of an intermediate condensation product in somewhat liquid form or the more developed resinous condensation product may be added in the form of a benzol solution. This may be followed by evaporation to effect separation of the solvent.

The coated particles may be bonded in rubber. Satisfactory results have been obtained by employing a bonding agent in the form of a dispersion of rubber. Preferably, a dispersion of rubber in an aqueous vehicle, such as may be obtained in rubber latex, including an anti-coagulating agent, for example, ammonia, is employed. Vulcanizing agents such as precipitated sulphur and accelerators such as piperidine and zinc oxide may be included. The ingredients including the coated particles are preferably intimately mixed in a mixing machine until coalescence begins. The process may be hastened by adding a coagulating agent such as acetic acid or other well-known coagulating agents for separating the rubber component from the aqueous vehicle. Coalescence may be obtained by air-drying or by heating to dry or by combined coagulation of heat in the presence of coagulating agents. However, the mixture of coated particles and dispersed rubber, such as latex, with or without the vulcanizing agents and accelerators, may be added to a bath including a solution of the coagulating agent and then the mixture of the coated particles and bond collected from the coagulating agent. In this latter form the shape of the mixture of rubber and coated particles may be predeterminedly shaped or the composition may be shaped after coagulation, as by molding. When the vulcanizing agent is omitted, the cold vulcanization or gaseous vulcanizing agents are employed. An example of a suitable mixture is as follows:

| | Parts by weight |
|---|---|
| Rubber dispersion, preferably latex (approximately 30% rubber) | 400 |
| Precipitated sulphur | 8 |
| Piperidine | 1 |
| Zinc oxide | 2 |

To this mixture is added approximately 500 to 1500 parts by weight of coated particles, dependent upon the characteristics of the final article, that is, whether it is to be formed into a rather rigid block, closely approaching a grinding wheel, or a flexible rather limp sheet or irregular surface conforming block. It will be understood that the sulphur component may be varied in accordance with the rigidity of the final product, the sulphur being increased to approximately one-third of the rubber latex when a rubber product of a hardness closely resembling vulcanite is desired, and as low as 3%, where extreme flexibility approaching limpness when formed into thin sheets, is desired. The rubber should preferably be present in proportions of 10–40% of the entire mass, calculating the rubber as rubber solids. When large quantities of the coated particles are incorporated with the rubber dispersion, the concentration of the rubber dispersion is preferably decreased. Where sulphur is employed, it may be added in quantities vary from 5 to 10% by weight, calculated upon the rubber solids. Where sulphur compounds are used, these should be present in equivalent quantities. The accelerators may be used up to 1% of the rubber weight calculated as rubber solids.

The process of bonding the coated particles may be modified by omitting the vulcanizing and accelerating agents and reacting the mixture of rubber dispersion and coated particles with a gaseous or liquid vulcanizing agent. This method is preferably employed when the final product is in the form of thin sheets or filaments. For this method the following formula has been found to be suitable:

| | Parts by weight |
|---|---|
| An aqueous dispersion of rubber, preferably rubber latex comprising 30% rubber | 400 |
| Zinc oxide | 2 |

The coated particles are intimately mixed with this mixture until coalescence begins. The coagulation is completed by heat or by employing a coagulating agent such as acetic acid or an acetate, or the mixture while still fluid may be spread in thin films of desired thickness and heated to a coagulating temperature of about 100 to 150° F. To facilitate evaporation of the water a slightly higher temperature may be employed. When acetic acid is used as the coagulating agent, a 10% acid solution is sufficient. This is preferably used in connection with latex which has an alkaline anti-coagulating agent. In this case only enough acetic acid is used to neutralize the alkaline material. Vulcanization may be completed by subjecting the film to a spray or vapor or gas for example, sulphur chloride may be employed. It will be understood that accelerating agents, such as piperidine, or the metal salts of amino acids and metallic dithiocarbamides may be used.

The coated particles may be satisfactorily bonded in a rubber component in the form of crepe rubber. In this method the mixture of rubber crepe and coated particles is effected upon rubber mixing rolls.

Satisfactory results have been obtained by mixing the particles coated with synthetic resin in a solution of rubber dissolved in benzol, preferably containing 10% of xylol. The amount of the rubber solution employed is determined by the degree of hardness or stiffness desired in the final product, as previously indicated in the examples where rubber solids are used. In this method the solution of rubber and coated particles is mixed to obtain uniformity and to evaporate the rubber solvent. In this method the final product may be obtained by extrusion or molding.

It has also been found that a highly desirable product may be obtained, using coated or uncoated particles, by adding synthetic resin as an intermediate condensation product when a rubber mixture including a vulcanizing agent is employed. The heat necessary to vulcanize the rubber forms a substantially infusible product. When a synthetic resin is employed, the resin content ranges up to 40%–60% to 100% of the rubber solids.

The synthetic resinous solution may also be added to a rubber solution in benzol, previously described, and this combined mixture of synthetic resin dissolved in benzol and rubber dissolved in benzol or benzol modified by 10% of xylol may be mixed. The desired quantity of coated or uncoated particles is added to this mixture. The quantity of synthetic resin and rubber solids employed in this method are calculated upon the basis described in Example 1, depending upon the desired flexibility of the final product. The rubber may be varied within the range previously indicated of 10–40% of the entire mass.

In another embodiment of the invention a combined dispersion of rubber and resin, such as a phenol formaldehyde condensation resin, may be utilized as the bond for coated or uncoated particles. In this embodiment the phenolic resinous condensation product is dispersed in water, preferably with a protective colloid amenable to mixture with the rubber latex solution employed.

In this embodiment the abrasive particles may be preliminarily coated by adding them to the dispersion of the phenolic resinous condensation product, coalescing the resin upon the abrasive particles, and then adding this mixture of coated abrasive particles and resin to the rubber latex or other dispersions of rubber. Similarly the abrasive particles may be added to solutions of the resin to effect a preliminary coating of the particles with the resin, and the resulting mixture can then be added to the rubber solution or dispersion above described, or may be incorporated in crepe rubber upon the mixing rolls, as above set forth.

It has been found that the rubber adheres tenaciously to the particles coated with synthetic resin and that the product may be used in abrading operations of high intensity, without fear of having the heat incident thereto destroy the rubber or loosen the particles from the rubber bond. Furthermore, the heat incident to the abrading operations will not destroy the predetermined physical properties of the entire articles, and a flexible product may be obtained which will retain its characteristics throughout its abrading life.

It is to be understood that, in the examples given, the rubber is capable of vulcanization subsequent to coalescence and coagulation. However, a dispersion of rubber may be prepared in which the particles are preliminarily vulcanized. In this embodiment the rubber component is retained in the dispersed form, preferably including a dispersion agent, and while in this condition the mixture is vulcanized by heat under a pressure in the neighborhood of 45 pounds for 30 minutes to an hour. To the mixture thus prepared may be added coated particles in accordance with the previous examples.

A dispersion of rubber in which the rubber particles are halogenated, as by chlorination, may also be employed as a bond for the coated particles. This dispersion may be obtained by chlorinating a solution of rubber in a solvent for rubber, such as benzol or carbon tetrachloride, then forming an emulsion of the chlorinated rubber, preferably in the aqueous medium, and then removing the solvent for the chlorinated rubber. The coated particles may then be added to the emulsion in which the chlorinated rubber forms the discontinuous or internal phase, as previously described.

The rubber, in the various forms above set forth, may be tempered by oil, oil and resins, natural or synthetic, or rubber substitutes, such as vulcanized oils, either before or after admixture with the abrasive particles. The mixtures previously described, before final coagulation, may be poured into suitable molds and the aqueous medium separated, leaving the coated abrasive particles and rubber bond in uniform and intimate mixture. In this example the aqueous medium may be separated by mere heating. The rubber in intimate contact with the coated abrasive particles may also be partially coalesced and, in this form, the mixture placed in a suitable mold and pressed to the desired form. Pressure may be accompanied by heat to complete the vulcanization. This procedure is adopted where it is desired to form a block. When it is desired to form abrasives for hand use, for example, in rubbing down rough paint jobs, coarse coated grits may be incorporated with the rubber suspension that is used. Very fine coated grits may also be employed, and the material molded in block form. The block thus obtained may be employed in place of pumice for varnished and lacquered surfaces, and for this purpose the vulcanization is carried out to produce a highly flexible product giving the block characteristics making it possible to conform to uneven surfaces. The product may also be molded into continuous bands or bolts and coated over drums for buffing or polishing or preparing objects for nickel plating.

In another embodiment of the invention, rubber dispersions of the character heretofore described, preferably latex, may have mixed therewith extremely fine grits coated with synthetic resins. Before coagulation has begun, the mixture is forced through fine orifices and then into a coagulating bath of acetic acid, or the like, in the form of continuous threads. These threads may be built up into a brush or a belt having bristles of this material for use in buffing metal for plating or other polishing operations.

In the above embodiment, for purposes of coagulating the threads, the material is preferably extruded into a bath of acetic acid of a strength of 10%. Vulcanization of these threads may be effected in this example, as well as in the others previously described, by a cold vulcanization process wherein the material has externally applied thereto sulphur chloride, preferably of 100% strength. The vulcanizing agent may, however, be incorporated in the rubber and, where sulphur is employed as the agent, it may be in quantities of about 2% for producing very flexible products. When organic accelerator compounds are included, vulcanization is completed by heat treatment. The sulphur or sulphur compound may be omitted and a quantity of accelerator mixed with the material to be extruded and the material extruded into a bath of sulphur chloride.

The features herein disclosed of making a flexible abrasive molded article in which the residuum of the rubber dispersion is employed and is essentially of a rubber base material, together with the method of molding and extruding the same, is the invention jointly made with George Netherly and is claimed in my joint application Serial No. 418,148, filed January 2, 1930.

Having thus described my invention and illustrated its use, what I claim as new and desire to secure by Letters Patent, is—

1. The method of making a composition article comprising substantially completely encasing particles in a synthetic resin, intimately mixing said particles so prepared in a solution of rubber and a synthetic resin and forming the mass so prepared into a flexible article.

2. An abrasive product comprising a mass of abrasive grain bonded by a composition comprising a mixture of rubber and a synthetic resin, said grain surfaces being substantially uniformly coated with a heat-polymerized synthetic resin having strong bonding affinity for both said grain and said rubber and resin bonding composition.

3. An abrasive product comprising a mass of abrasive grain bonded by a vulcanized composition comprising a mixture of rubber and a synthetic resin, said grain surfaces being substantially uniformly coated with a heat-polymerized synthetic resin having strong bonding affinity for both said grain and said rubber and resin bonding composition.

4. An abrasive product comprising a mass of abrasive grain bonded by rubber in vulcanized condition mixed with a synthetic resin, said grain surfaces being substantially uniformly coated with a heat-polymerized synthetic resin having strong bonding affinity for both said grain and the rubber and resin bond.

LLOYD A. HATCH.

CERTIFICATE OF CORRECTION.

Patent No. 2,309,108. January 26, 1943.

LLOYD A. HATCH.

It is hereby certified that error appears in the printed specification of the above numbered patent requiring correction as follows: Page 1, second column, line 9, for "partciles" read --particles--; page 2, first column, line 43, for "vary" read --varying--; page 3, first column, line 64, for "bolts" read --belts--; and that the said Letters Patent should be read with this correction therein that the same may conform to the record of the case in the Patent Office.

Signed and sealed this 25th day of April, A. D. 1944.

Leslie Frazer

(Seal) Acting Commissioner of Patents.